US007729001B2

(12) United States Patent
Perronnin

(10) Patent No.: US 7,729,001 B2
(45) Date of Patent: Jun. 1, 2010

(54) INTEGRATION OF CONTENT-BASED RELEVANT INFORMATION INTO PRINT JOBS AND APPLICATIONS USING SAME

(75) Inventor: Florent Perronnin, St. Martin d'Héres (FR)

(73) Assignee: Zerox Corporation, Norwalk, CT (US)

(*) Notice: Subject to any disclaimer, the term of this patent is extended or adjusted under 35 U.S.C. 154(b) by 747 days.

(21) Appl. No.: 11/635,204

(22) Filed: Dec. 7, 2006

(65) Prior Publication Data

US 2008/0137132 A1 Jun. 12, 2008

(51) Int. Cl.
*G06F 3/12* (2006.01)
*G06K 15/00* (2006.01)

(52) U.S. Cl. .................................... 358/1.15; 358/1.18

(58) Field of Classification Search ................ 358/1.15, 358/1.1, 1.2, 1.6, 1.9, 3.28, 1.11, 1.12, 1.13, 358/1.14, 1.18, 407, 401, 501, 400, 468, 358/1.16, 1.17, 404, 444; 705/400, 408, 705/14.72, 14.73, 14.69, 14.68, 14.67, 14.62, 705/62, 60; 399/1, 8, 9; 347/1, 2, 3, 5, 14, 347/23; 715/274, 273

See application file for complete search history.

(56) References Cited

U.S. PATENT DOCUMENTS 5,924,108 A * 7/1999 Fein et al. ................... 715/267
6,549,299 B1 * 4/2003 Allen et al. ................ 358/1.18
6,891,635 B2 * 5/2005 Dutta ........................ 358/1.15
2002/0073003 A1 * 6/2002 Levine ........................ 705/30
2003/0171988 A1 9/2003 Sugihara
2004/0059435 A1 3/2004 Goldberg et al.

* cited by examiner

*Primary Examiner*—Dov Popovici
(74) *Attorney, Agent, or Firm*—Fay Sharpe LLP

(57) ABSTRACT

In a printing method, summarizing information is extracted from a print job. Additional content is generated based on the summarizing information. The additional content is integrated into the print job to produce an augmented print job including the additional content. The augmented print job is printed. In an illustrative advertising application, summarizing information is extracted from a print job, advertising content is selected from a database of advertising content based on the summarizing information, and the selected advertising content is integrated into the print job.

21 Claims, 5 Drawing Sheets

INTEGRATION OF CONTENT-BASED RELEVANT INFORMATION INTO PRINT JOBS AND APPLICATIONS USING SAME

BACKGROUND

Printing costs are a substantial expense for many corporations, universities, and other organizations. These costs can include for example: initial cost of the printing systems; paper cost; toner or ink cost; repair costs in the form of individual repair calls or a long-term repair contract; and so forth. Printers under heavy use such as is typical in corporations, universities, or other organizations often require frequent repairs, and the operating lifetime for these devices may be only a few years or less. Moreover, because it is highly advantageous to have ready access to printing capability, these printing costs are not readily outsourced.

One approach for reducing printing costs is to place an emphasis on frugality, for example by purchasing "economy" model printers, lower cost paper, and so forth. However, this involves problematic trade-offs. An economy printer may produce a lower quality printed product. Lower cost paper may correspond with lower quality paper. The resulting reduction in the quality of printed documents can adversely impact organizational operations, for example by leading to failed business proposals, lost business opportunities, and so forth. The apparent savings may be offset by increased repair costs, more frequent paper jams, shortened printer lifetime, and consequent increased downtime and possibly missed deadlines.

Another approach sometimes taken is to aggressively limit or prohibit printing of personal papers and other non-organizational work. However, the quantity of personal printing is typically low as a proportion of the total printing load, which limits the savings achievable by this approach. Strict enforcement of such limiting or prohibiting rules can also adversely affect employee morale.

Another approach sometimes taken is to shift printing costs to end users. For example, a university department may require its professors and researchers to supply their own printing paper. The savings produced by these approaches are, however, illusory—the costs remain, and are merely hidden by the accounting shift.

CROSS-REFERENCE TO RELATED APPLICATION

Goldberg et al. Ser. No. 10/667,957 filed Sep. 22, 2003, published as U.S. Publ. Appl. 2004/0059435 A1 on Mar. 25, 2004, and now abandoned, relates generally at least to methods and apparatuses for inserting serendipitous information into whitespace areas of a print job based on a static profile of the user generating the print job. U.S. Publ. Appl. 2004/0059435 A1 published Mar. 25, 2004 is incorporated by reference herein in its entirety.

BRIEF DESCRIPTION

Method and apparatus embodiments are disclosed as illustrative examples.

In an illustrated printing method embodiment, summarizing information is extracted from a print job. Additional content is generated based on the summarizing information. The additional content is integrated into the print job to produce an augmented print job including the additional content. The augmented print job is printed.

In an illustrated advertising system embodiment, summarizing information is extracted from a print job. Advertising content is selected from a database of advertising content based on the summarizing information. The selected advertising content is integrated into the print job.

In an illustrated print job augmentation apparatus embodiment, a content analyzer is configured to extract a content summary of a print job. An additional content generator is configured to generate additional content based on the content summary. An integrator is configured to integrate the additional content into the print job to generate an augmented print job.

DETAILED DESCRIPTION

Figure 1:
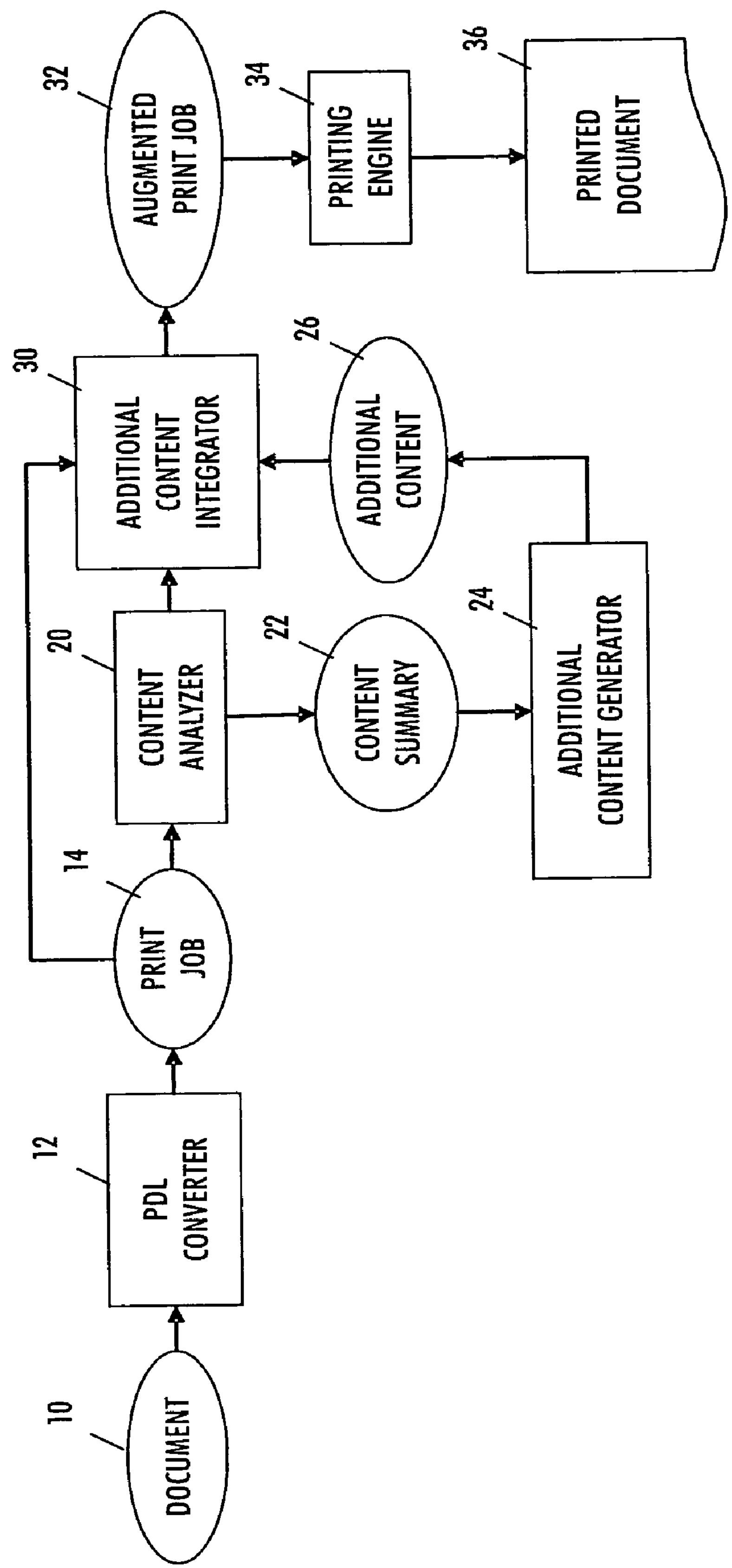
FIG. 1 diagrammatically shows a system for augmenting print jobs based on print job content.

With reference to FIG. 1, an illustrative system for augmenting print jobs based on content is described. A document 10 is sent to a printing system. For example, the document 10 may be generated by a word processing application, spreadsheet application, presentation application, or so forth, and the operation to send it to the printing system may involve selecting File-Print or another suitable command sequence in the application. Alternatively, the document may be automatically generated, for example by a network monitoring program, a financial database monitoring program or so forth.

The document 10 optionally undergoes selected pre-processing. In the illustrated system, this pre-processing includes processing by a page description language (PDL) converter 12 which converts the document to PDL content such as a PostScript format, a portable document format (PDF), or so forth. The pre-processing may include adding header information indicating the printing system destination, user identification, or so forth. The pre-processing may include adding a cover sheet containing information such as the name or other identification of the initiating user, a timestamp, or so forth. The result of the pre-processing is a print job 14. In some embodiments, the pre-processing is omitted and the document 10 directly corresponds with the print job 14.

The content of the print job 14 is analyzed by a content analyzer 20, which generates a content summary 22. The nature of the content analyzer 20 and of the output content summary 22 depends upon the type of augmenting desired. In some embodiments, the content analyzer 20 performs a semantic analysis, keyword analysis, or the like which focuses on the meaning or topic of the document. In some embodiments, the content analyzer 20 analyzes images, for example outputting the content summary 22 as a classification (or average classification, or predominant classification, or the like) of the images contained in the document 14. In some embodiments, the content analyzer 20 analyzes content of the print job 14 in terms of print job characteristics, such as paper usage or monetary print cost. Other content analyses or combinations thereof can be used.

Based on the content summary, an additional content generator 24 generates additional content 26 for integration into the print job 14. For example, if the content summary 22 is a semantic summary, or a keyword summary, image classification, or the like, then the additional content 26 may include advertisements, news, or the like relating to the meaning, topic, or image class indicated by the content summary 22. If the content summary 22 relates to print job characteristics, then the additional content 26 may be a text-based representation of these print job costs.

An additional content integrator 30 integrates the additional content 26 into the pre-processed print job content 14. In the illustrated embodiment, the content analyzer 20 provides information as to where to insert the additional content 26 as part of the content summary 22. For example, the content analyzer 20 may identify a whitespace area of a cover sheet as suitable for inserting the additional content 26. It is also contemplated to insert the additional content 26 into margins of printed pages, or into additional dedicated pages. In some embodiments, the additional content is always inserted into the same whitespace area, such as a whitespace area of the cover sheet that is always left blank. In such embodiments, the content analyzer 20 suitably does not identify the whitespace area.

The output of the additional content integrator 30 is an augmented print job 32, such as an augmented PDL document in the case of the illustrated embodiment. This augmented print job 32 is submitted to a printing engine 34 in the usual manner in which print jobs are submitted to the printing engine 34, and the print engine 34 generates a printed document with the additional printed content 36. For example, in some embodiments the printing engine 34 performs raster image processing (RIP) to generate bitmaps of pages of the augmented print job 32, and renders these bitmaps on sheets of paper or another physical medium using a suitable marking engine such as a laser printer, ink jet printer, dot-matrix printer, or so forth. The printing engine 34 is intended to be broadly construed as encompassing any device incorporating a marking engine for rendering the augmented print job 32, such as a dedicated printer, a multi-function printing device (that may, for example, include printing, copying, facsimile, or other capabilities), or so forth.

Figure 2:
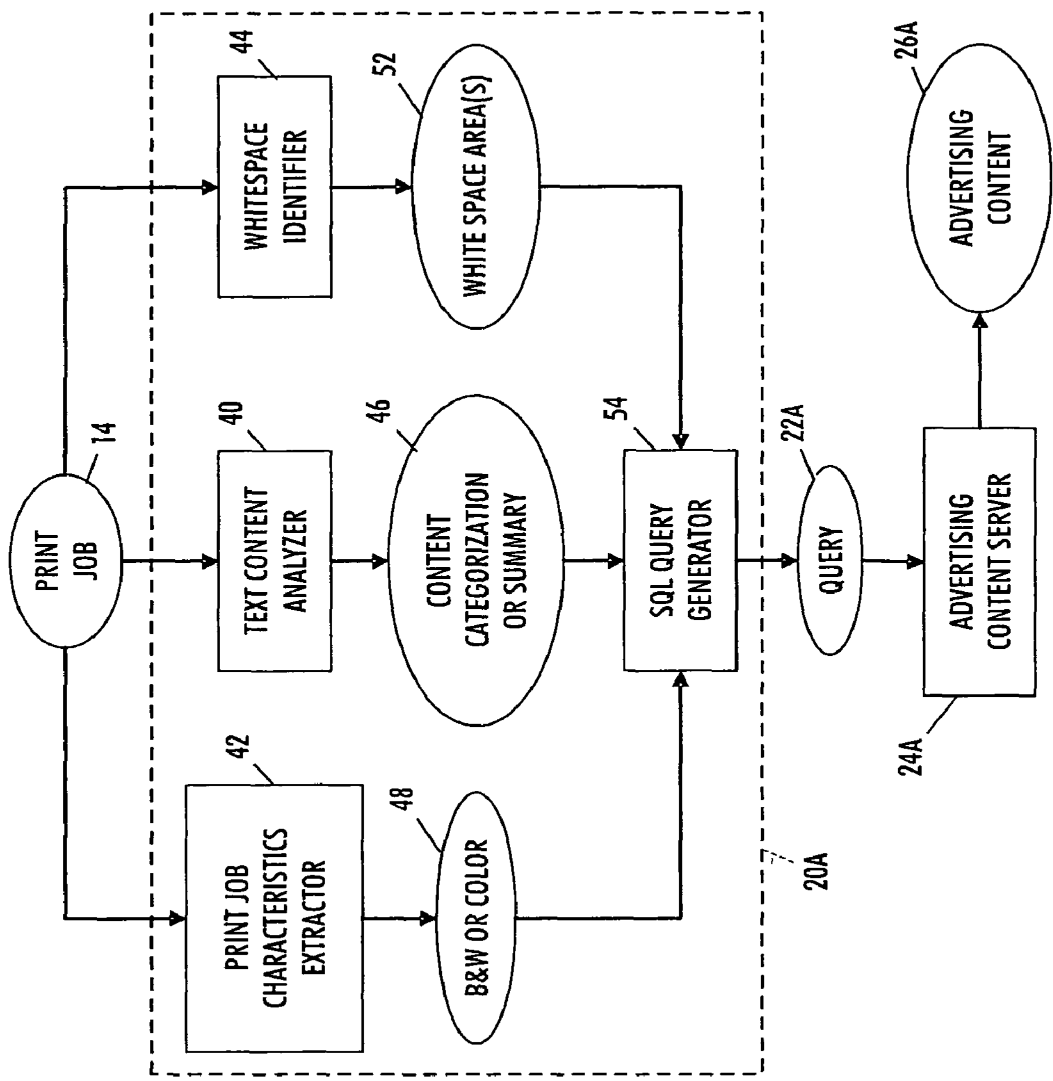
FIG. 2 diagrammatically shows an embodiment of the content analyzer and additional content generator components of the system of FIG. 1.

With continuing reference to FIG. 1 and with further reference to FIG. 2, in some embodiments the illustrative system for augmenting print jobs based on content is used to insert print cost-defraying advertising content into the print jobs. FIG. 2 illustrates a suitable content analyzer **20*a* and additional content generator 24*a* for this application. The content analyzer 20*a* includes a text content analyzer 40, an optional print job characteristics analyzer 42, and an optional whitespace identifier 44. The text content analyzer 40 analyzes the text of the print job 14 to identify a content categorization or summary 46 such as a list of keywords, or a semantic classification of the print job 14, or a classification of images in the print job 14, or so forth. The optional print job characteristics analyzer 42, if included, provides additional information about the print job 14 that may be useful in selecting appropriate advertising content for insertion into the document 14. In the illustrated embodiment, the print job characteristics analyzer 42 outputs an indication 48 of whether the print job 14 is a black and white print job or a color print job. This information is suitably used to ensure that a color advertisement is not inserted into a black and white print job (where it may lose its appeal or even be unintelligible) and to ensure that a black and white advertisement is not inserted into a color print job (where its lack of color may make it less appealing or less eye-catching, and hence less effective as an advertisement). In other embodiments, the optional print job characteristics analyzer 42 may provide other information about the print job 14 such as print resolution, paper type, or so forth that may be useful in selecting appropriate advertising content. The optional whitespace identifier 44 identifies one or more whitespace areas 52 of the print job 14 into which the advertising content is suitably inserted. For example, the whitespace identifier 44 may identify whitespace of a cover sheet of the print job 14. In some embodiments, the same whitespace area may be used for advertising content in each print job, such as for example a portion of the cover sheet that is always otherwise left blank. In such embodiments, the whitespace identifier 44** is suitably omitted.

In the illustrated embodiment, the additional content generator **24*a* is embodied as an advertising content server. The advertising content server 24*a* may be located within a local area network of the printing system, such as on a networked computer in the building of a corporate or other organizational facility. Additionally or alternatively, the advertising content server 24*a*** may be located off-site, for example being embodied as an Internet-based website having a suitable identifying uniform resource locator (URL) address.

In the illustrated embodiment, the advertising content server **24*a* is embodied as a database configured to receive and respond to structured query language (SQL) queries. Accordingly, the content analyzer 20*a* includes an SQL query generator 54 configured to construct the content summary 22 as an SQL query 22*a*. For example, the SQL query generator 54 may construct the SQL query 22*a* identifying (i) a table of advertising content; (ii) a category of advertising content (corresponding to a category column of the advertising table; and (iii) a maximum size of the advertising content (corresponding to a size bin column of the advertising table, with the maximum size selected based on the dimensions of the whitespace area or areas 52). The advertising content server 24*a* responds by selecting suitable advertising content 26*a* satisfying the category and size criteria specified in the SQL query 22*a*, and this selected advertising content 26*a* corresponds to the additional content 26 of FIG. 1. The advertising content 26*a*** can in general be of any format, including text, graphics, mixed text and graphics, icons, or so forth. The SQL formulation is an illustrative example, and other communication protocols or embodiments of the advertising content server can be used instead.

Figure 3:
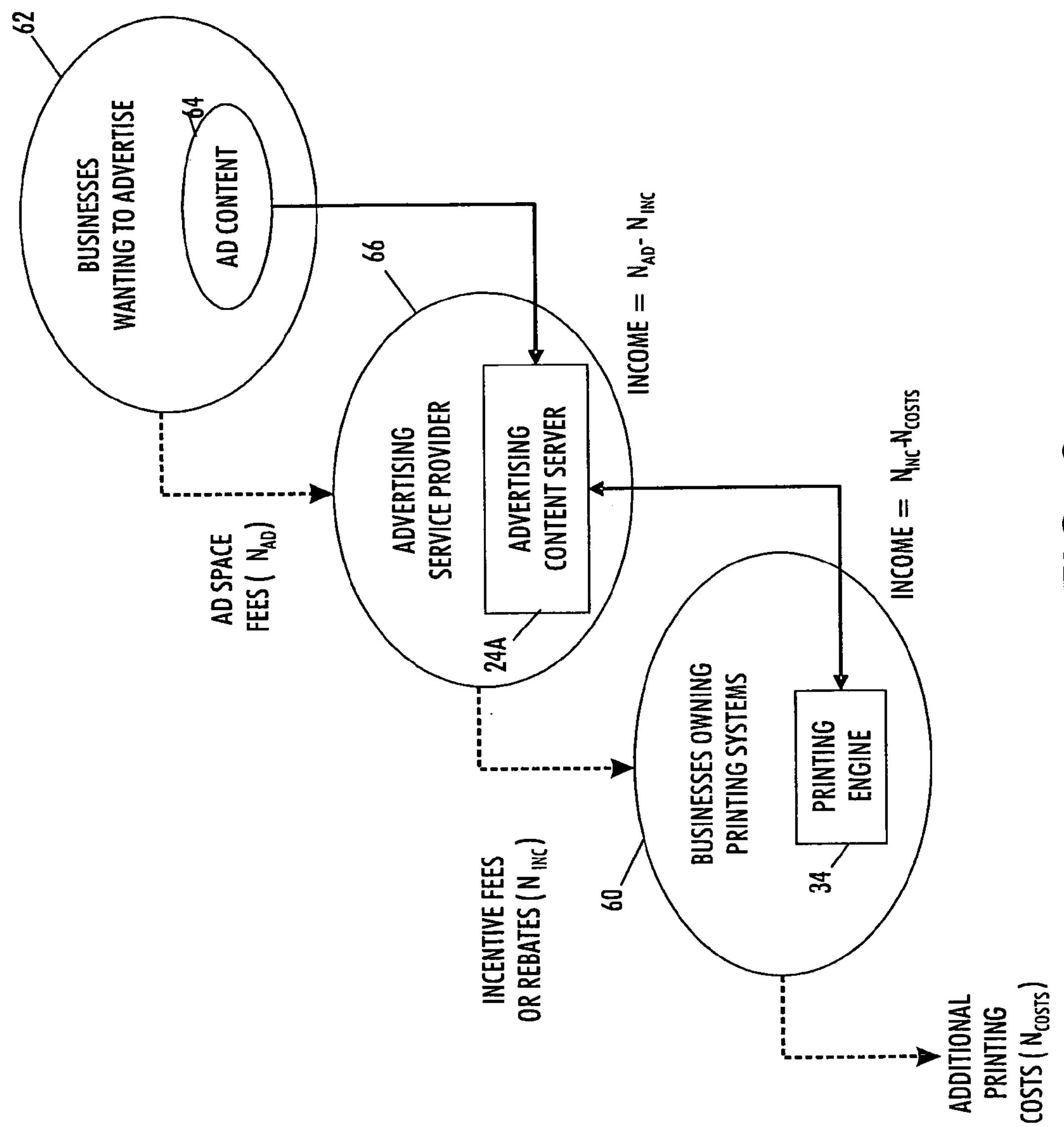
FIG. 3 diagrammatically shows an advertising business model suitably implemented using the system of FIGS. 1 and 2.

With reference to FIG. 3, a suitable business model for the advertising application of FIGS. 1 and 2 is described. In FIG. 3, transmissions of data are diagrammatically indicated by solid arrowed connectors, while transmissions of money or monetary equivalents (such as financial credit, product purchase rebates, or so forth) are indicated by dotted arrowed connectors. The business model involves various businesses 60 each owning printing systems, such as the illustrative printing engine 34. These businesses 60 want to defray their printing costs. The business model also involves various businesses 62 that want to advertise. These businesses 62 generate advertising content 64 that is uploaded to the advertising content server **24*a*, along with suitable metadata such as category information, size information, a color or black and white indicator, or so forth. In the illustrative business model of FIG. 3, the advertising content server 24*a* is maintained by an advertising service provider 66, which contracts with the businesses 62 generate advertising content 64 and with the businesses 60 owning printing systems. In a suitable financial model, each of the businesses 62** generate advertising content 64 pays advertising space fees, denoted $N_{ad}$ in FIG. 3. These advertising fees $N_{ad}$ represent income from which the advertising service provider 66 generates profit. Some of these advertising fees $N_{ad}$ are paid to the businesses 60 owning printing systems as incentive fees, denoted $N_{inc}$ in FIG. 3, that provide incentive for the businesses 60 owning printing systems to allow their printing systems to be used to print advertisements.

It is understood that there are costs, denoted $N_{costs}$ for the businesses 60 owning printing systems to use their printing systems to print advertisements. These costs include, for example, toner costs, wear and tear costs, and so forth. If the advertisements are printed on separate sheets accompanying the print job, then the costs $N_{costs}$ include these sheet costs as well. Some additional contribution to the costs $N_{costs}$ may involve computer processing time used by the content analyzer 20*a* and any portion of the additional content analyzer 24*a* that is executed on computers of the businesses 60. In view of these costs $N_{costs}$, the net income to the businesses 60 owning printing systems is $N_{inc}-N_{costs}$. Accordingly, the condition $N_{inc}>N_{costs}$ is required for the businesses 60 owning printing systems to effectively defray their printing costs by allowing advertising.

The net income for the advertising service provider 66 is $N_{ad}-N_{inc}$, that is, the revenue generated by advertising space fees $N_{ad}$ minus the cost of providing the incentives $N_{inc}$ to the businesses 60 owning printing systems to use their printing systems to print advertisements. Here, $N_{ad}>N_{inc}$ is the required condition for the advertising service provider 66 to make a net profit. In some business models, the advertising service provider 66 is contemplated to also be the printing services provider for the businesses 60 owning printing systems—in such arrangements, the incentives $N_{inc}$ may include monetary equivalents, such as a percentage discount on a service contract for the printing system. It is also contemplated for the advertising service provider 66 to be omitted from the business model, in which case the businesses 62 that want to advertise contract directly with the businesses 60 owning printing systems to use their printing systems to integrate advertising content into print jobs. In this arrangement, the net profit (or net print cost defrayment) is $N_{ad}-N_{costs}$, that is, the advertising space fees $N_{ad}$ paid by the businesses 62 that want to advertise minus the costs $N_{costs}$ associated with printing the advertisements.

In any such embodiments, it should be noted that the costs $N_{costs}$ associated with printing the advertisements is limited in several ways. First, the printing system is already being brought into operative mode to execute the print job 10; accordingly, there is little or no additional expense for energy used to restart a printing system that is in a "sleep" or energy-saving mode prior to receiving the print job. Similarly, the fuser and other energy-consuming components are already being heated or otherwise energized to perform the print job, and so the additional expense added by printing the advertisements is low. Moreover, if the advertising content is printed in whitespace areas of a cover sheet, or in margins of printed sheets of the print job, or so forth, then there is no additional sheet cost. Accordingly, the costs $N_{costs}$ can be relatively low, making the business model of FIG. 3 or similar business models commercially viable.

The advertising business model diagrammatically shown in FIG. 3 is an illustrative example. Other business models can be used to support the advertising system of FIGS. 1 and 2. For example, in another contemplated business model the advertisements are provided by the printing system manufacturer and service provider, and relate to printing products and services or other products and services offered by that manufacturer and service provider. In one suitable approach, a discount or rebate is provided on the printing system service contract in return for allowing pushing of advertising content onto cover sheets or other whitespace areas of print jobs using the system of FIGS. 1 and 2. More generally, the advertising application of FIGS. 1 and 2 has the effect of pushing advertising content onto whitespace areas of print jobs. Since the printing of this advertising content entails added printing costs, the business model should provide a financial or other incentive to the entity paying those added printing costs. Typically, those incentives will come from the advertisers paying monetary or other compensation in return for pushing their advertisements via the system of FIGS. 1 and 2.

In some business model embodiments, it is contemplated for the advertiser to be the same entity that pays the added printing costs. In these embodiments, the business model is simplified as the advertiser recoups the added printing costs of the advertising using the system of FIGS. 1 and 2 through increased sales or other benefits provided by the advertising.

Figure 4:
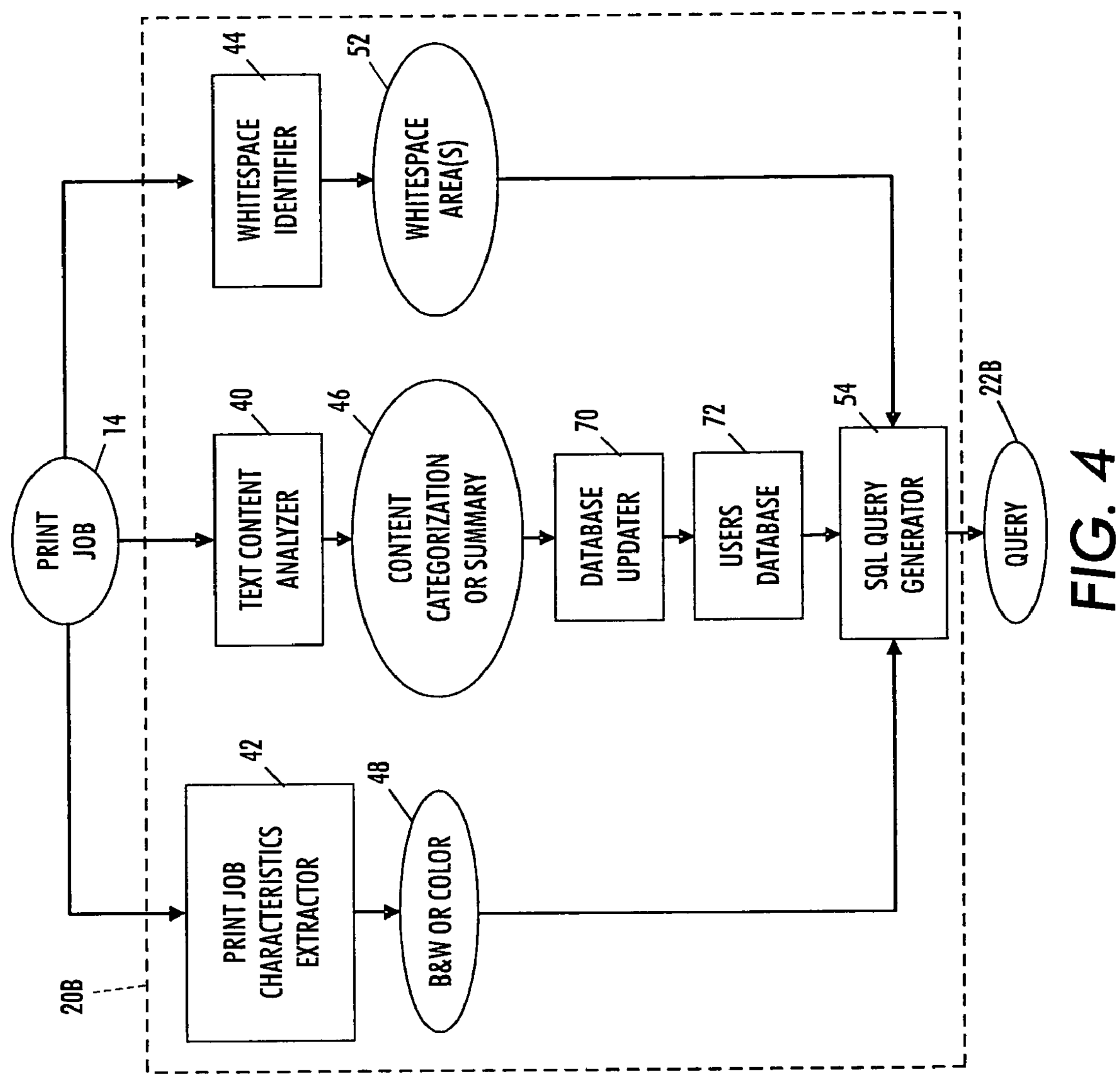
FIG. 4 diagrammatically shows another embodiment of the content analyzer component of the system of FIG. 1.

With reference to FIG. 4, another content analyzer 20*b* is disclosed, which is suitably substituted for the content analyzer 20*a* in the advertising application of the system of FIGS. 1 and 2. The content analyzer 20*b* includes the text content analyzer 40, optional print job characteristics analyzer 42, and optional whitespace identifier 44 which operate as already described with reference to FIG. 3 to generate the content categorization or summary 46, black and white or color indicator 48, and indication of whitespace area or areas 52. The content analyzer 20*b* differs from the content analyzer 20*a* in that the content categorization or summary 46 is used differently. Rather than inputting this categorization or summary 46 directly into the SQL query generator 54, this information 46 is instead used by a database updater 70 to update a users database 72. Specifically, the content categorization or summary 46 is used by the database updater 70 to update a user profile of a user who generated the print job 10. So in this embodiment each time a user, for example user John Smith, generates a print job, the text content analyzer 40 analyzes that print job and generates the content categorization or summary 46. The database updater 70 uses this information 46 to update user John Smith's profile in the users database 72. The updated profile for user John Smith is input to the SQL query generator 54 which generates a query 22*b* based on John Smith's profile. This approach is expected to provide, over time, advertisements that are more consonant with John Smith's interests as reflected by the body of print jobs generated by user John Smith over a period of time. In contrast, using only the content categorization or summary 46 of the current print job 10 in selecting the advertising content may lead to unusual and perhaps undesirable results in cases where the print job is an unusual one for the user.

The advertising content server 24*a* may have additional features. For example, a filter may be provided to filter out certain advertising content that may be deemed inappropriate for a particular printing system owner. For example, a company "A" that produces widgets and has a printing system that prints advertising content might want to filter out advertising content from competing company "B" that also produces widgets. Similarly, some companies or other printing system owners may want to filter out certain content that is deemed to be too risqué, or is deemed to be culturally inappropriate, ethically objectionable, or otherwise undesirable. Similar filtering may be performed by geographical region, for example to restrict the output of geographically associated advertising content from the advertising content server 24*a* to printing systems located in the associated geographical area. (For example, distribution of political advertisements might be limited to the country, state, county, or other political district of the advertising political candidate).

The content analyzer 20, 20*a* may also include various features. In some embodiments, the identified whitespace may include page margins. In such embodiments, identification of the page margins as suitable whitespace areas for integrating advertising content may be prohibited for print jobs employing high print quality, under the assumption that such high quality printouts should not be marred by advertising content. In contrast, the page margins may be used for advertising in print jobs that employ draft mode, under the assumption that such documents are not final printouts and can acceptably include advertising content in the margins. Such selectivity is optionally also be provided via a user profile or configuration, or by a user selection made at the time the document print job 10 is generated, or so forth.

The embodiments described with particular reference to FIGS. 2-4 are described with reference to advertising applications, in which advertising content is integrated into the print job to defray print costs or to provide additional income or other compensatory benefits. The advertising content is print cost-related content in that the advertising content impacts print costs by providing a revenue stream that at least partially offsets print costs, assuming that the advertising-related revenue is greater than the added print cost of printing the advertisements. Although the embodiments of FIGS. 2-4 are described with reference to pushing advertising content, these embodiments are readily adapted to pushing other types of content, including content unrelated to print cost but selected based on the meaning or topic of the print job 14. For example, the additional content may include news items or so forth that are related to the keywords, semantic classification, image classification, or other content summary generated by the content analyzer 20.

Figure 5:
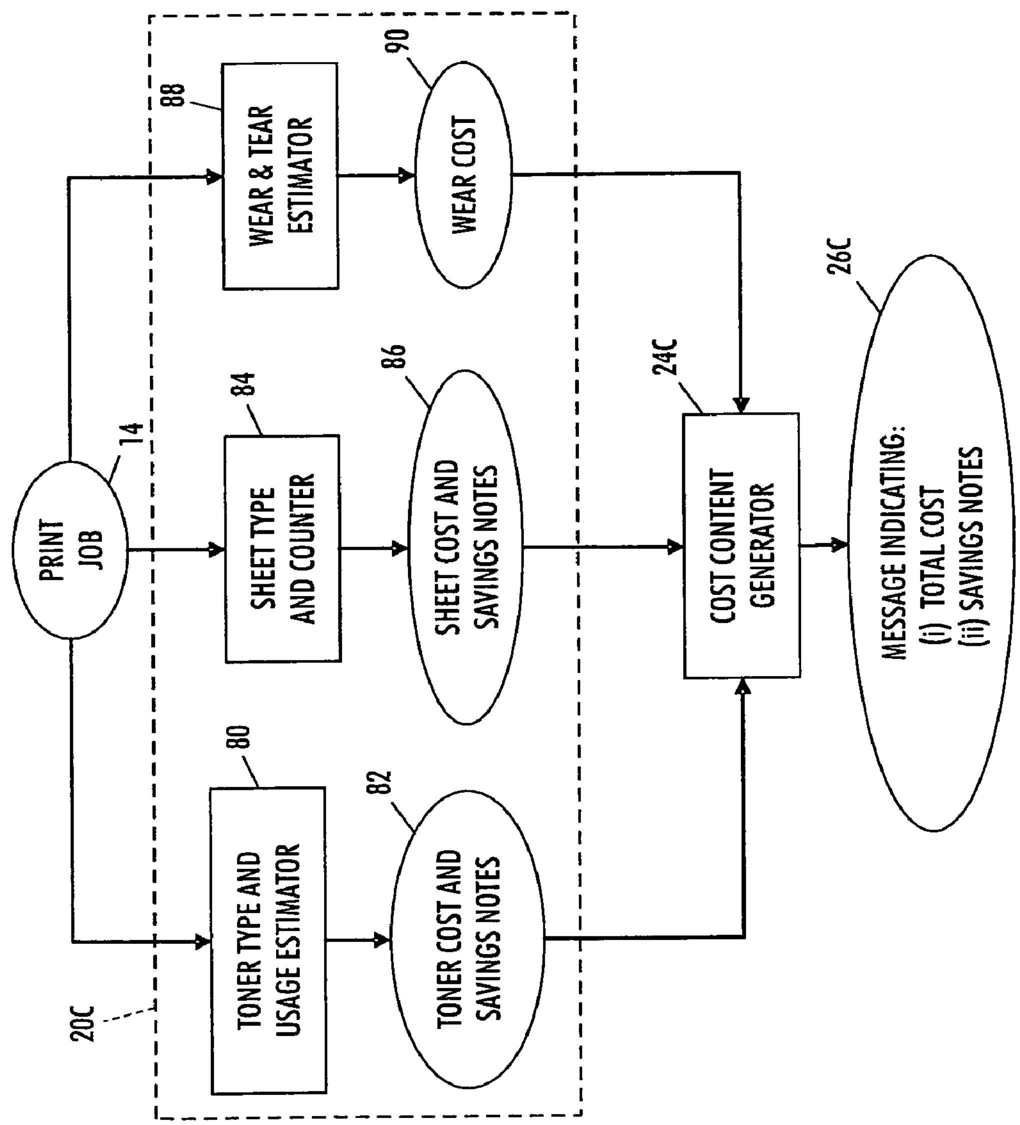
FIG. 5 diagrammatically shows another embodiment of the content analyzer and additional content generator components of the system of FIG. 1.

With reference to FIG. 5, another application of the illustrative system of FIG. 1 for augmenting print jobs based on content is disclosed. The application of FIGS. 1 and 5 push print cost-related content which is not advertising content. Here, the print cost is not defrayed directly, via advertising, but rather indirectly, by attempting to influence printing system users to operate more efficiently by pushing print cost-related content suggesting ways to reduce printing costs. In this embodiment, a content analyzer 20*c* serves as the content analyzer 20 of FIG. 1. The content analyzer 20*c* does not analyze semantic content, meaning, or topic. Rather, the content analyzer 20*c* analyzes the content of the print job 14 in terms of printing cost-related content. For example, the illustrated content analyzer 20*c* includes a toner type and usage estimator 80 that identifies the toner type (for example, black toner or color toner) and toner amount that will be used in executing the print job (based, for example, on the fractional marking coverage of pages of the print job 14), and estimates a toner cost 82 from this information. Optionally, the toner type and usage estimator 80 further estimates savings costs for various possible modifications to the print job, and includes these savings notes in the estimated toner cost information 82. For example, if the print job uses color toner, the toner type and usage estimator 80 estimates the cost using the specified color toner, and optionally also estimates the cost of the print job had black toner been used instead.

Similarly, a sheet type and count estimator 84 identifies the sheet type (for example, letter or A4, paper weight or bond type, and so forth) and the number of sheets that will be used in executing the print job, and estimates a sheet cost 86 from this information. Optionally, the sheet type and count estimator 84 further estimates savings costs for various possible modifications to the print job, and includes these savings notes in the estimated sheet cost information 86. For example, if the print job uses more expensive A4 paper, the sheet type and count estimator 84 estimates the cost using the specified A4 paper, and optionally also estimates the cost of the print job had lower cost letter paper been used instead.

As another example, a wear and tear estimator 88 estimates the wear and tear cost of executing the print job, and estimates a wear cost 90 from this information. For example, the wear cost 90 may include an amortized cost estimate for the wear placed on rollers, fuser components, or other consumable components of the printing system in executing the print job 14.

The cost estimate information 82, 86, 90 is input to a cost content generator 24*c* that serves as the additional content generator 24 for this application. The cost content generator 24*c* generates a message 26*c* indicating the total cost of the print job, optionally broken down into cost components such as are provided by the information components 82, 86, 90. Optionally, the message 26*c* further includes savings notes, again derived from the saving notes portions of the information components 82, 86, 90. For example, a suitable message 26*c* generated by the cost content generator 24*c* might read as follows:

This print job consists of 152 pages printed on A4 paper using high quality color mode.

The estimated cost of this print job is $9.65.

If this print job had been printed on letter paper, you could have saved an estimated $1.01.

If this print job had been printed in black and white, you could have saved an estimated $3.67.

If this print job had been printed in draft mode, you could have saved an estimated $0.87.

This message does not directly impact print costs, except to the extent that additional toner is used to print the message so as to incrementally increase the print cost by a small amount. However, providing the print cost-related message 26*c* to the user at the time the user picks up the printout is advantageous as a way to motivate users to be more efficient in using the printing system. By way of example, upon reading the illustrative message written above, the user may be surprised to learn that $3.67 could have been saved by printing in black and white, rather than in color. As a result, in the future the user may consider printing draft documents in black and white, thus reducing printing costs overtime through behavior modification instigated by the print job augmentation application of FIGS. 1 and 5. In contrast, the user may learn that using draft mode saves relatively little money, and accordingly in the future may continue to elect to use the high quality print mode so as to obtain better quality printouts without substantially increasing printing costs. Overall, the user is made aware in a timely fashion of the cost and cost components of his or her printing activities, and accordingly is motivated toward more cost-effective usage of the printing system. Rather than generating the additional content as a text-based message, the cost information can be generated as a bar graph, pie chart, or other representation.

The system of FIGS. 1 and 5 is an illustrative example. Other types of non-semantic and non-topic related content analysis can be used in generating the additional content 26. As another example, if the administrator of the printing system is more concerned about print job throughput than printing cost, then the content analyzer 20 may be configured to estimate print job execution time, optionally including components contributing to longer print job execution time. For example, the content analyzer 20 may identify types of content of the print job 14 that take a relatively long time to RIP and mark, and optionally may suggest other formats for this content that would print faster. For example, text content that is represented in an image format in the print job 14 may take longer to print than substantively identical content represented as ASCII or another symbolic format. The content analyzer 20 may identify such content and suggest using the symbolic equivalent. As another example, the content analyzer may estimate print execution time both for the printer to which the print job 14 is directed, and also for another higher speed printer whose use the system administrator wants to encourage. Providing this comparison may be a way to motivate users to direct at least some print jobs to the higher speed printer.

In similar fashion, additional content may be integrated to encourage other behaviors, such as using a more recent or updated version of word processing software. In this embodiment, the content analyzer 20 analyzes the print job 14, which is produced by a word processing application in this embodiment, to determine which version of the word processing application was used to generate the print job. If an earlier or otherwise less preferred version was used, additional content can be generated and integrated into the cover sheet or elsewhere to suggest that the user upgrade to the more recent or otherwise preferred version of the software.

In other contemplated embodiments, the print job augmentation system of FIG. 1 can be used to incorporate appropriate boilerplate text, a standard logo, or other standard content into documents of certain types. For example, a business may produce certain documents related to a particular project or client. These documents should all include a standard logo, standard text, or some other standard content. Other documents should not include the standard content since it does not apply to those other documents. However, in some cases the user may inadvertently omit the standard content in documents that should include it. The system of FIG. 1 can be used to add the standard content in such cases.

In one approach, the content analyzer 20 is configured to determine whether the print job 14 is directed to the project or client for which the standard content applies. This can be done, for example, by searching for a project code, client name, identifying keywords, or another indicator that the document is related to the project or client for which the standard content is appropriate. If the print job 14 is so related, then the content analyzer 20 determines whether the print job 14 already contains the standard content, for example using a simple text string search, image recognition algorithm (in the case of a standard logo), looking for keywords of standard text, or so forth. If the standard content is already in the document, then no additional content is added. If the standard content has been omitted, then the additional content generator 24 is configured to output the standard content as additional content for insertion into the page margins or in other whitespace areas of the print job.

In some contemplated embodiments, the check for whether the standard content is already included is omitted. That is, the standard content is always integrated into a print job of the appropriate type, without checking whether the standard content is already included in the print job. Omitting the check for duplication may be appropriate, for example, if the user is not expected to insert the standard content, and instead the system of FIG. 1 is relied upon to insert this standard content. Omitting the check for duplication may also be appropriate if potential duplication of the standard content in the document is not problematic.

The various embodiments disclosed herein are in general combinable in various ways. For example, the system of FIG. 1 can be configured to both insert advertising content based on content analysis of the print job 14 and to insert standard content into documents for which such standard content is appropriate. The integration may take various forms or combinations of forms. For example, advertising content, a print cost message, or both may be inserted into whitespace of the cover sheet, while standard content (if appropriate) may be inserted into page margins. Moreover, while insertion into whitespace areas of the print job 14 is a typical integration approach, other integration approaches may be used. For example, if the additional content includes standard content that should be positioned immediately after the title of the document, then the additional content integrator 30 may perform the integration by inserting the standard content below the title, where it belongs, and shifting the subsequent text or other content downward by a suitable amount.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing method comprising:

extracting summarizing information from a print job wherein the extracting of summarizing information includes extracting cost information relating to executing the print job;

generating additional content based on the summarizing information;

integrating the additional content into the print job to produce an augmented print job including the additional content; and printing the augmented print job.

2. The printing method as set forth in claim 1, wherein the extracting of summarizing information further comprises:

extracting a summarization of textual, semantic, or topical content of the print job.

3. The printing method as set forth in claim 2, wherein the extracting of a summarization of textual, semantic, or topical content of the print job comprises:

extracting one or more classification keywords from the print job.

4. The printing method as set forth in claim 2, wherein the generating of additional content comprises:

selecting one or more advertisements based on the summarization of textual, semantic, or topical content of the print job.

5. The printing method as set forth in claim 4, wherein the integrating comprises:

inserting the one or more advertisements into one or more whitespace areas of a cover sheet of the print job.

6. The printing method as set forth in claim 1, wherein the integrating comprises:

inserting the additional content into one or more whitespace areas of a cover sheet of the print job.

7. The printing method as set forth in claim 1, wherein the integrating comprises:

inserting the additional content into one or more whitespace areas of the print job.

8. The printing method as set forth in claim 1, further comprising:

updating database information associated with the print job based on the extracted summarizing information, the generating of additional content being based on the updated database information.

9. The printing method as set forth in claim 8, wherein the database information associated with the print job comprises database information associated with a user who generated the print job.

10. The printing method as set forth in claim 1, wherein the generating of additional content comprises generating content setting forth the extracted cost information, and the integrating comprises inserting the content setting forth the extracted cost information into one or more whitespace areas of a cover sheet of the print job.

11. The printing method as set forth in claim 1, wherein the generating of additional content comprises:

generating content setting forth (i) at least one recommended print job change and (ii) an estimated cost saving associated with the at least one recommended print job change.

12. The printing method as set forth in claim 1, wherein the extracting of summarizing information further includes identifying a print job type, and the generating of additional content includes generating standard content conditional upon identifying the print job as a selected print job type.

13. An advertising method comprising:

extracting summarizing information from a print job;

selecting advertising content from a database of advertising content based on the summarizing information;

integrating the selected advertising content into the print job by inserting the selected advertising content into one or more whitespace areas of a cover sheet of the print job; and printing the print job including the integrated selected advertising content.

14. The advertising method as set forth in claim 13, further comprising:

receiving an incentive for the printing of the integrated selected advertising content.

15. The advertising method as set forth in claim 14, wherein the receiving of the incentive comprises:

receiving monetary or monetary-equivalent compensation at least sufficient to compensate for a cost of the printing of the integrated selected advertising content.

16. A print job augmentation apparatus comprising:

a content analyzer configured to extract a content summary of a print job, wherein the content analyzer includes an estimator configured to estimate at least one component of cost of executing the print job;

an additional content generator configured to generate additional content based on the content summary; and an integrator configured to integrate the additional content into the print job to generate an augmented print job.

17. The apparatus as set forth in claim 16, wherein the additional content generator comprises:

a database of advertising content, the additional content generator configured to generate additional content further including selected advertising content retrieved from the database based on the content summary.

18. The apparatus as set forth in claim 17, wherein the integrator is configured to integrate the selected advertising content into at least one whitespace area of a cover sheet of the print job.

19. The apparatus as set forth in claim 16, further comprising:

a printing engine configured to print the augmented print job.

20. The apparatus as set forth in claim 16, wherein the additional content based on the content summary includes at least one recommended cost-saving print job change.

21. The apparatus as set forth in claim 20, wherein the additional content based on the content summary further includes an estimated cost saving associated with the at least one recommended cost-saving print job change.

* * * * *

UNITED STATES PATENT AND TRADEMARK OFFICE

CERTIFICATE OF CORRECTION

PATENT NO. : 7,729,001 B2
APPLICATION NO. : 11/635204
DATED : June 1, 2010
INVENTOR(S) : Florent Perronnin It is certified that error appears in the above-identified patent and that said Letters Patent is hereby corrected as shown below:

Title page, item (73) should read as follows:

(73) Assignee: Xerox Corporation, Norwalk CT (US)

Signed and Sealed this

Seventeenth Day of August, 2010

David J. Kappos
*Director of the United States Patent and Trademark Office*